(12) United States Patent
Tatarinov et al.

(10) Patent No.: US 9,662,982 B2
(45) Date of Patent: May 30, 2017

(54) METHOD FOR PRODUCING AN INSTRUMENT PANEL SUPPORT

(71) Applicant: BENTELER AUTOMOBILTECHNIK GMBH, Paderborn (DE)

(72) Inventors: Konstantin Tatarinov, Bielefeld (DE); Hermann Relard, Delbrueck (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 14/830,922

(22) Filed: Aug. 20, 2015

(65) Prior Publication Data

US 2016/0052395 A1    Feb. 25, 2016

(30) Foreign Application Priority Data

Aug. 22, 2014   (DE) .......................... 10 2014 112 056

(51) Int. Cl.
   *G12B 9/00*   (2006.01)
   *B60K 37/04*  (2006.01)

(52) U.S. Cl.
   CPC ........ *B60K 37/04* (2013.01); *B60K 2350/941* (2013.01)

(58) Field of Classification Search
   CPC ... B62D 25/145; B60K 2350/94; B60K 37/04
   See application file for complete search history.

(56) References Cited

U.S. PATENT DOCUMENTS

2011/0278876 A1* 11/2011 Hitz .................... B62D 25/145
                                                                296/72
2013/0312242 A1* 11/2013 Tamagawa ........... B62D 25/147
                                                                29/464

FOREIGN PATENT DOCUMENTS

| DE | 102005043504 A1 | 4/2007 |
| DE | 102006044699 A1 | 4/2008 |
| WO |   2008034522 A1 | 3/2008 |

* cited by examiner

*Primary Examiner* — Amy Sterling
(74) *Attorney, Agent, or Firm* — Hauptman Ham, LLP

(57) ABSTRACT

The present invention relates to a method for producing an instrument panel support comprising a receiver for an attachment, in particular a head-up display, wherein the instrument panel support is configured as an elongated component extending in the motor vehicle transverse direction, characterized by the following method steps:
  producing an instrument panel support as a welded component with fastening points at the ends for coupling to a motor vehicle body and at least two protruding arms for receiving the head-up display,
  inserting the welded component with the fastening points in a calibration tool,
  moving a die toward the arms,
  moving one respective stamp die toward the opposing side of the arms and pressing the stamp die against the die, wherein receiving surfaces are stamped in the arms for receiving the head-up display,
  removing the instrument panel support.

4 Claims, 7 Drawing Sheets

METHOD FOR PRODUCING AN INSTRUMENT PANEL SUPPORT

RELATED APPLICATIONS

Figure 1:
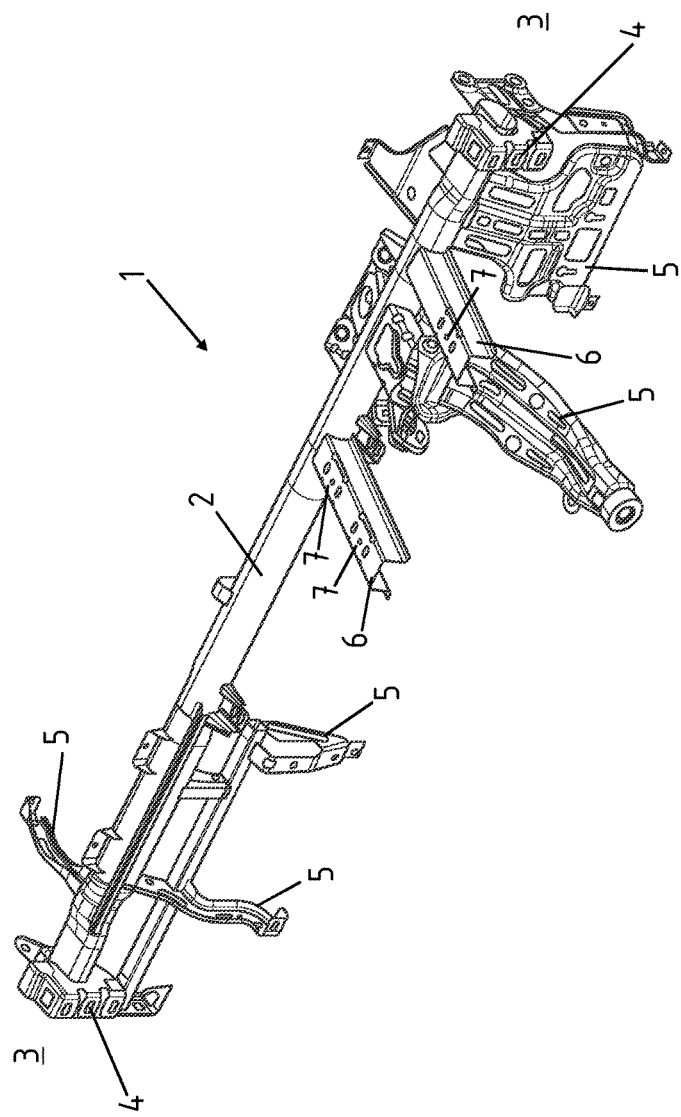

The present application claims priority from German Application Number 102014112056.6, filed Aug. 22, 2014, the disclosure of which is hereby incorporated by reference herein in its entirety.

The present invention relates to an instrument panel support for receiving a head-up display.

Instrument panels which are also denoted as dashboard panels or dashboards are used in motor vehicles. The motor vehicle instruments which provide information about the operating state, such as the speed, rotational speed or oil temperature, are usually accommodated in such an instrument panel on the driver's side. Generally, a display for the vehicle entertainment and the vehicle infotainment is accommodated centrally and a glove compartment is located on the passenger side. Different arrangements are provided below such an instrument panel so that, on the one hand, ventilation channels for the vehicle interior air-conditioning extend below the instrument panel or other modules are received, for example control devices and/or airbags are also provided below the instrument panel.

So that the instrument panel itself is now arranged in the motor vehicle body and the various aforementioned components are received securely and fixedly in position, an instrument panel support is arranged below an instrument panel. In this case, this is generally a component made of a metal material which extends in the vehicle transverse direction. Such an instrument panel support has a main body in the center in the form of a tubular body which extends in the motor vehicle transverse direction. The tubular body generally has fastening points at the ends in order to be fastened in the motor vehicle body itself. In particular, the fastening is carried out in the region of the motor vehicle A-pillar. So that different components may now be fastened to the instrument panel support, in particular to the tubular body, arms are configured thereon, in particular the arms are welded to the tubular body. The arms thus protrude from the tubular body. For example, such an instrument panel support is disclosed in DE 10 2005 043 504 A1.

Moreover, motor vehicles are provided nowadays with a projection unit which projects graphical information onto the windshield. This projection unit is also called a head-up display. The installed position of a head-up display requires specific tolerances to be maintained so that the optical projection system is represented optimally relative to the field of view of the driver and without distortion, taking into account the curvature of the windshield.

It is the object of the present invention to disclose a possibility for producing an instrument panel support, by means of which it is possible to produce a receiver for an attachment, in particular a head-up display, in a simple manner in terms of production technology but with a high degree of dimensional accuracy.

Advantageous variants of the present invention form the subject-matter of the dependent claims.

The method according to the invention serves for producing an instrument panel support comprising a receiver for an attachment part, in particular a head-up display, wherein the instrument panel support is configured as an elongated component extending in the motor vehicle transverse direction and is characterized by the following method steps:

producing an instrument panel support as a welded component with fastening points at the ends for coupling to a motor vehicle body and at least two protruding arms for receiving the head-up display, inserting the welded component into a calibration tool, wherein the fastening points are preferably received accurately in terms of geometry, in particular in their subsequent desired position, moving a die toward the arms, moving one respective stamp die toward the opposing side of the arms and pressing the stamp die against the die, wherein receiving surfaces are stamped in the arms for receiving the head-up display, removing the instrument panel support.

By means of the method according to the invention it is possible to produce two arms which protrude from the instrument panel support and which are oriented in the same direction, with receiving surfaces which have a particularly high degree of accuracy regarding their relative position to the fastening points of the instrument panel support. In this case, according to the invention costly post-treatment methods, for example by producing an adhesively bonded connection between the receiving surface and the arm, with an adjustment of the adhesive bonding gap, may be dispensed with.

The instrument panel support may be produced as a conventional welded component with sufficient production accuracy by the welding process itself. The particularly high requirement for accuracy regarding the orientation of the position of the receiving surfaces for receiving the head-up display is seen to be relative to the fastening points of the instrument panel support on the motor vehicle body.

The instrument panel support is fastened to the A-pillars in the motor vehicle body, in turn resulting in a relative dimension to the windshield which is also located between the A-pillars of the motor vehicle body. In this case, for receiving the head-up display, the receiving surface now has to maintain a positional tolerance of 1.0 mm to the fastening points on the A-pillars and, in particular, of less than 0.5 mm to one another. This results in a tolerance of +/−0.25 mm. With the production tolerances and/or distortion which occur during welding, it would be almost impossible to maintain these tolerances.

To this end, the method according to the invention provides that a welded component is produced with a sufficient requirement of accuracy relative to the fastening points. This produced welded component is then introduced into a calibration tool, in particular a gauge, and is measured therein. Depending on the resulting tolerances, a die is now moved toward the arms which serve to receive the head-up display and, in particular, comes to bear positively thereagainst. This die then determines the relative position of the arms relative to the fastening points of the instrument panel support. Stamp dies are now moved toward the die, in particular in this case a plurality of stamp dies are located on a plunger. The stamp dies are thus also brought to bear against the arms in a positive manner. Depending on the required position of the receiving surface, the stamp dies are now pushed into the die such that, as a result, receiving surfaces are stamped in the arms. Thus defined surface regions in one respective arm, in particular receiving surfaces, are displaced relative to the remaining arms by reshaping techniques such that they are moved into the required position, taking into account the possible tolerances and the spring-back effect.

The stamping operation in this case takes place essentially in one direction. In particular, this is carried out relative to the motor vehicle Z-direction. In particular, however, it is also possible within the scope of the invention to carry out calibration oriented in the motor vehicle Z-direction.

Subsequently, the die is moved away and the instrument panel support is removed. The instrument panel support thus produced requires no further post-treatment regarding the accuracy of the position of the receiving surfaces relative to the fastening points of the instrument panel support itself and the position of the receiving surfaces to one another.

Depending on the type of coupling used for the head-up display to the instrument panel support, the head-up display may be directly bonded, for example, to the receiving surfaces. However, particularly preferably nuts may also be attached onto or introduced into the receiving surfaces before, during or after the stamping operation, the head-up display then being screwed to said nuts. For example, welded-in nuts, bonded-in nuts or even riveted-in nuts may be used. Particularly preferably, these nuts may be provided before or during the stamping process on or in the receiving surface, so that the position of the nuts is determined with a high degree of accuracy at the same time as taking into account the predetermined manufacturing tolerances. Within the scope of the invention, however, after producing the receiving surfaces with a high degree of dimensional accuracy it is also possible to introduce the corresponding threaded supports therein or to couple said threaded supports thereto.

In particular, when carrying out the method according to the invention it is possible to cater for production tolerances in the manufacturing process for the instrument panel support as a welded component. Deviations of the arms regarding the relative accuracy due to manufacturing tolerances and/or distortion during the thermal joining process may be compensated by the stamping operation which is carried out downstream for producing the receiving surfaces for the head-up display.

So that, after positively bearing against the arm, the stamp die is able to be pushed in further toward the die, a spring material is provided in the die on the side which opposes the stamp die, said spring material deflecting in the direction of the die when the stamp die is pressed against the arm. The sheet metal material of the arm located between the die and the stamp die is accordingly pushed in toward the die and at the same time stamped and calibrated and/or reshaped. To this end, the spring material is configured, in particular, as a spring assembly or is even made from a plastics material, in particular from a polymer. The spring material in this case should have sufficient rigidity for a spring force to counter-act the pushing-in of the stamp die. This reliably prevents the arm itself from being varied in its position and/or deformed by the stamping operation.

In a preferred variant of the method according to the invention, it is provided that the receiving surface is stamped with an oversized portion by the stamp die. This means that the stamp forces the receiving surface sufficiently far into the die that said receiving surface is deformed beyond the desired dimension relative to the remaining arm. When the stamp die is retracted, in this case depending on the material used and/or geometry of the receiving surface, the receiving surface springs back relative to the actual position after the stamp die has been fully pushed in, so that allowing for the spring-back effect the desired position is subsequently adopted.

So that now the receiving surface may be particularly easily deformed relative to the arm, said receiving surface is partially cut out on one edge surrounding the receiving surface. Particularly preferably, the receiving surface is connected via at least two webs, in particular via four webs, to the edge of the remaining arm surrounding the receiving surface, in particular in one piece and in the same material.

For example, in one arm which is configured as a profiled component, in particular as a U-shaped profile, the receiving surface may be cut out on its edge over part of the periphery. To this end, for example, production methods such as laser beam cutting, plasma beam cutting or even water jet cutting may be used. Preferably, however, the cutting is already carried out when the arm material is itself cut to size. The stamp die then bears against the receiving surface and deforms said receiving surface in its position relative to the remaining arm, wherein in this case in particular the webs are deformed to ensure the desired position of the receiving surface once the shaping process is complete.

Within the scope of the invention, in this case it is also possible that the at least two, in particular three and particularly preferably four, receiving surfaces to be produced adopt respective relative positions to one another. For example, two arms may be produced spaced apart from one another and oriented in the same direction to one another, and the receiving surfaces may be produced with an inclination relative to the respective other arm. Particularly preferably, therefore, a further three-dimensional shaping is possible during the calibration step.

By means of the method according to the invention, therefore, it is possible for the receiving surfaces to be produced less than or equal to +/−0.25 mm to one another and +/−0.5 mm to the fastening points of the instrument panel support by means of calibration.

The invention further comprises an instrument panel support for receiving a head-up display which is produced, in particular, according to a method described above. To this end, the instrument panel support comprises an elongated main body extending in the transverse direction of the motor vehicle with fastening points at the ends for coupling to a motor vehicle body, wherein at least two arms oriented in the same direction are welded to the main body. The instrument panel support according to the invention is characterized in that at least one receiving surface which is made in one piece and of the same material is formed on each arm, wherein the receiving surface is configured to be offset to the surface surrounding said receiving surface, in particular is configured to be offset in parallel, and the two receiving surfaces, therefore the receiving surfaces of each arm to one another and to the fastening points, have a tolerance in the motor vehicle vertical direction of less than +/−0.25 mm.

An Offset surface is understood, in particular, as a surface which is configured to be offset in parallel and/or with a vertical offset relative to the region surrounding said surface. Within the scope of the invention, however, the surface may also be offset at an angle and/or one part of the surface may be negatively offset and a further part of the surface may be positively offset relative to the peripheral surface of the remaining arm in the motor vehicle vertical direction. The tolerance relates to a desired dimension from which the receiving surface is configured less than + or −0.25 mm. This is realized by the welded component being initially produced and subsequently the receiving surfaces being calibrated by a shaping process and/or stamping process. Within the scope of the invention, however, it might also be conceivable that initially the arms are treated by shaping techniques and welded, and in a subsequent calibration process the receiving surfaces already present in the arm are calibrated again.

Particularly preferably, one arm has two receiving surfaces whereas the other arm has only one receiving surface. It might also be conceivable within the scope of the invention for both arms to have two respective receiving surfaces.

Preferably both receiving surfaces are aligned in one plane relative to one another. Within the scope of the invention, however, it might also be conceivable that the receiving surface of at least one arm is configured to be offset in parallel to the other receiving surfaces. Both receiving surfaces of one arm may also be configured to be offset in parallel to the receiving surface and/or the receiving surfaces of the other arm. Also particularly preferably, the receiving surfaces of both arms may be arranged at an angle to one another. For example, both receiving surfaces may extend in a V-shape to one another, so that as a result the head-up display is already automatically centered when positioned on the V-shape formed by the receiving surfaces.

The features described above regarding a threaded support and any other coupling means relating to the receiving surfaces are also relevant to the instrument panel support.

Figure 2:
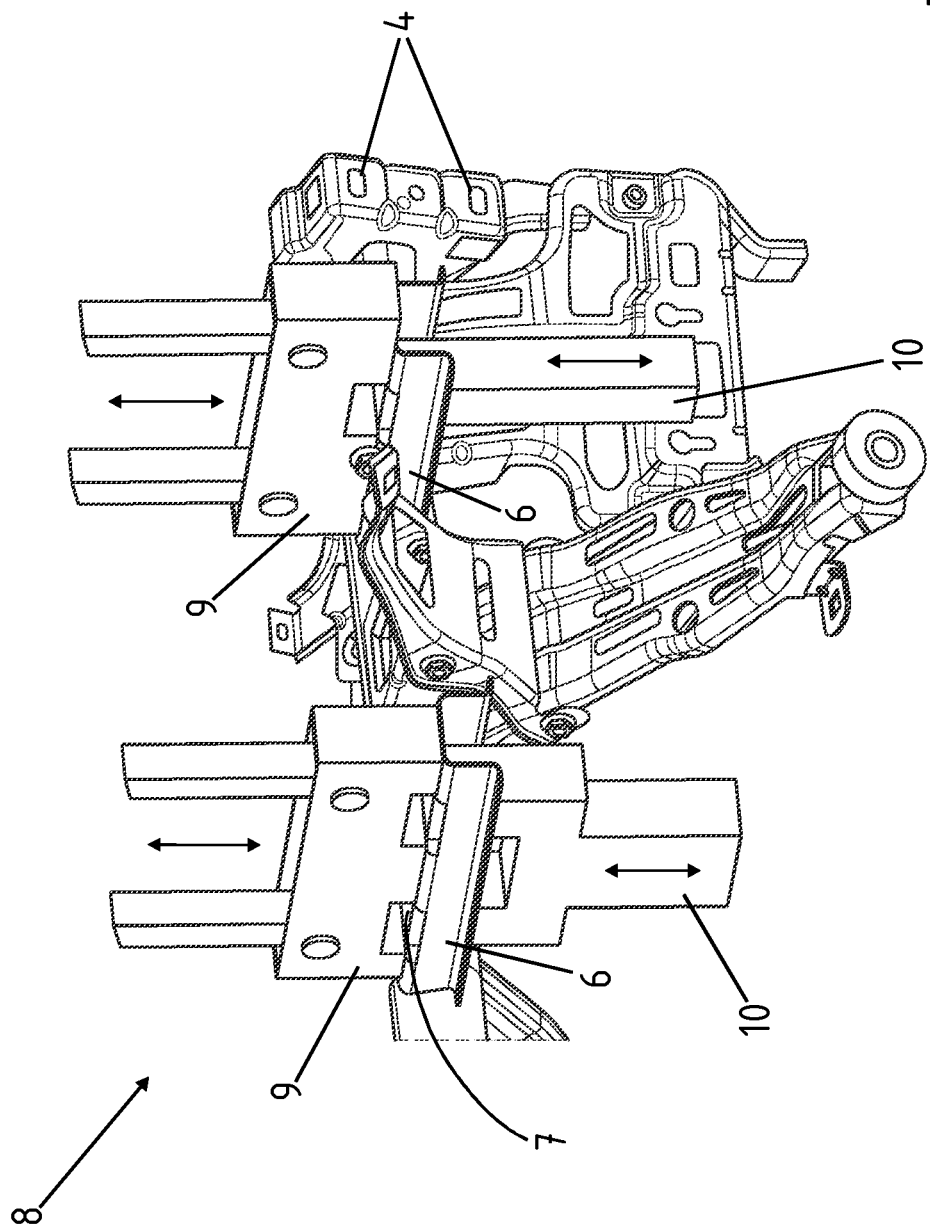
Figure 3:
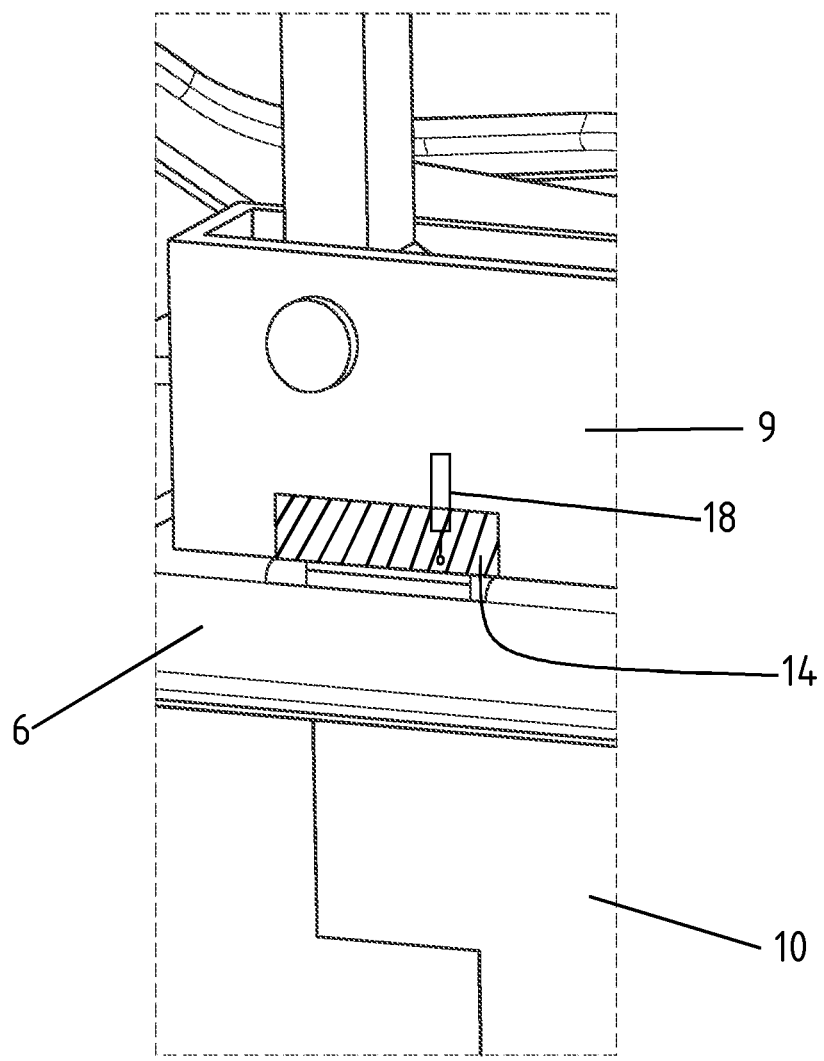
Figure 4:
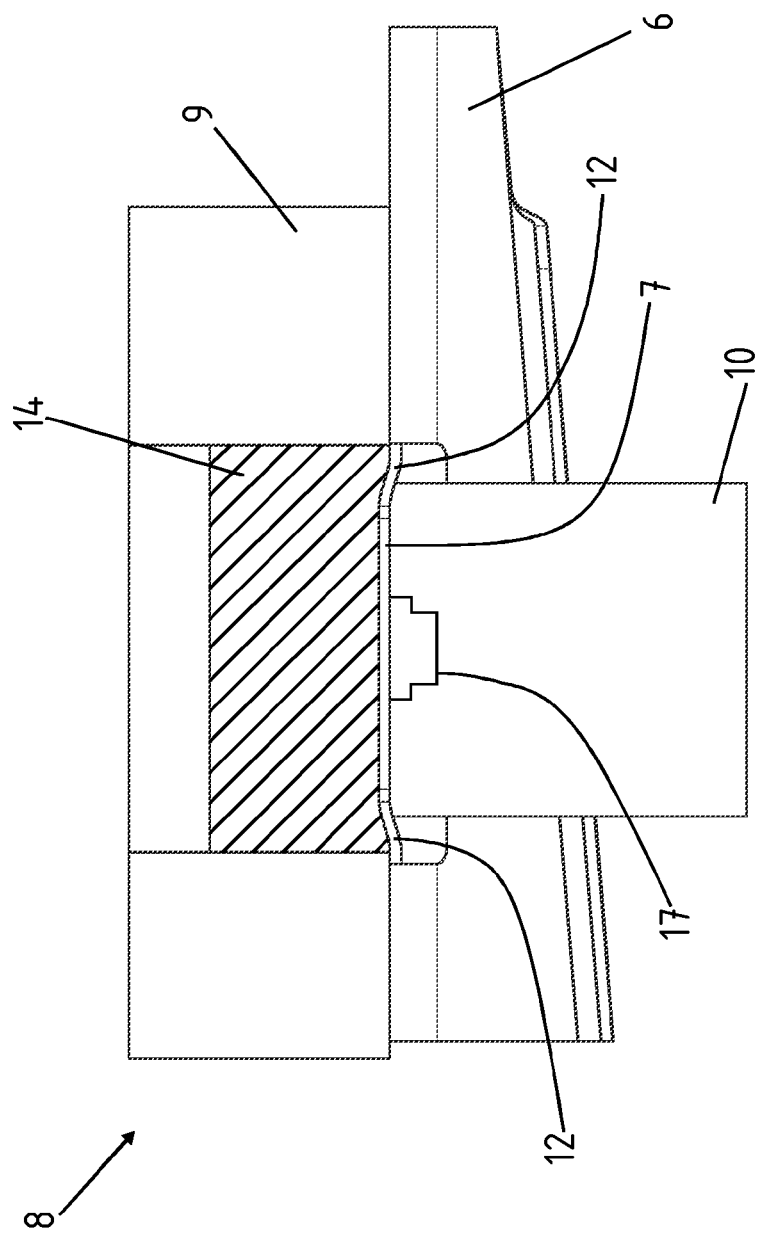
Figure 5:
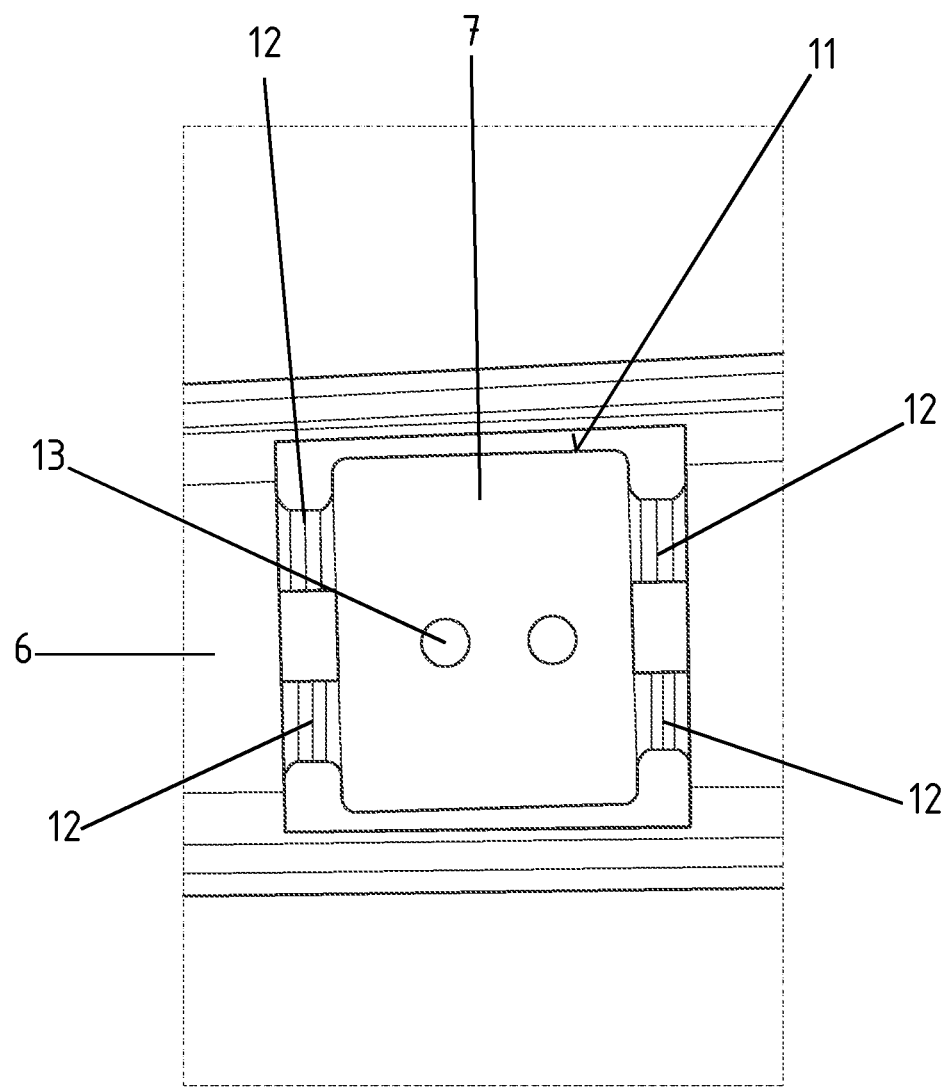
Figure 6A:
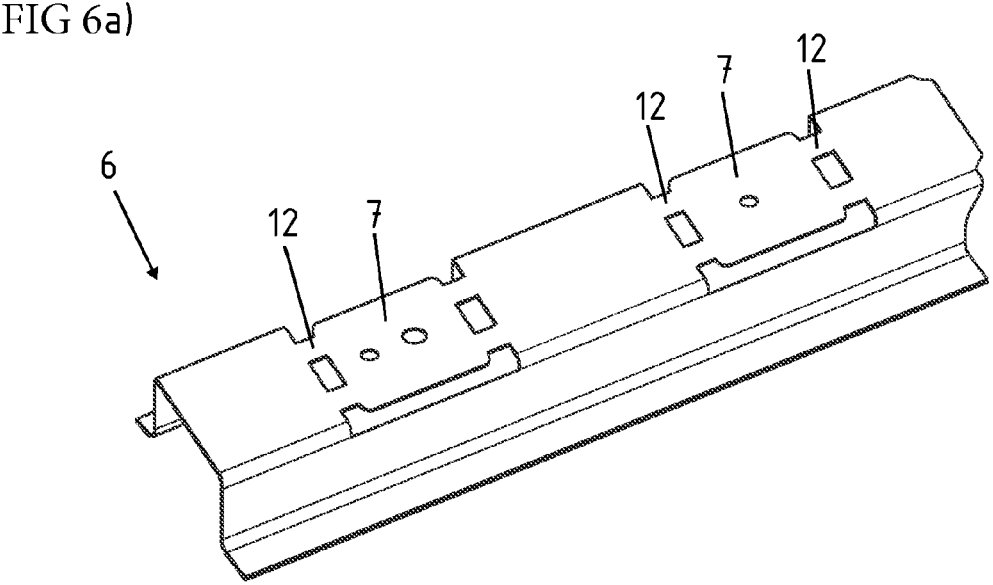
Figure 7A:
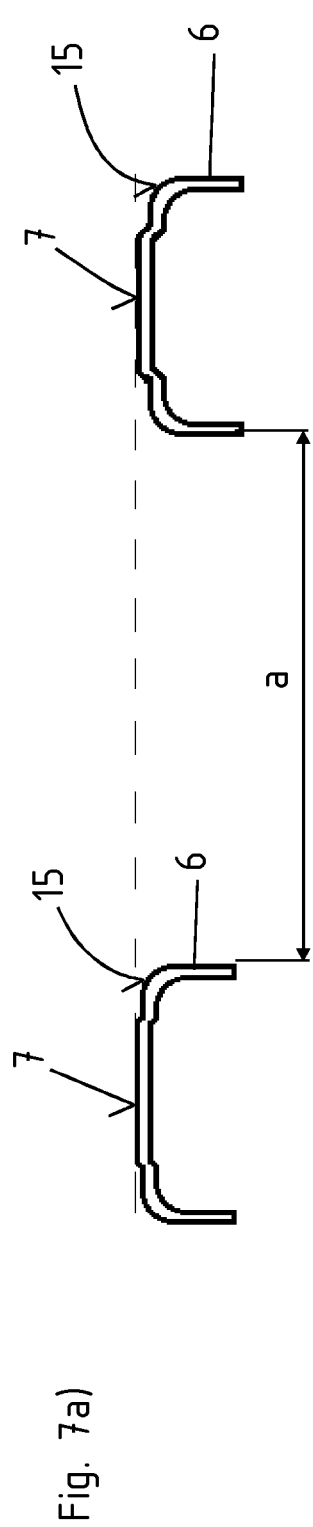
Figure 7B:
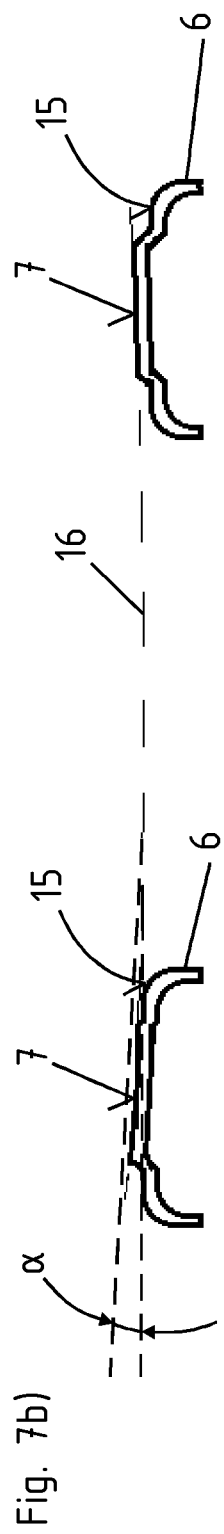
Figure 7C:
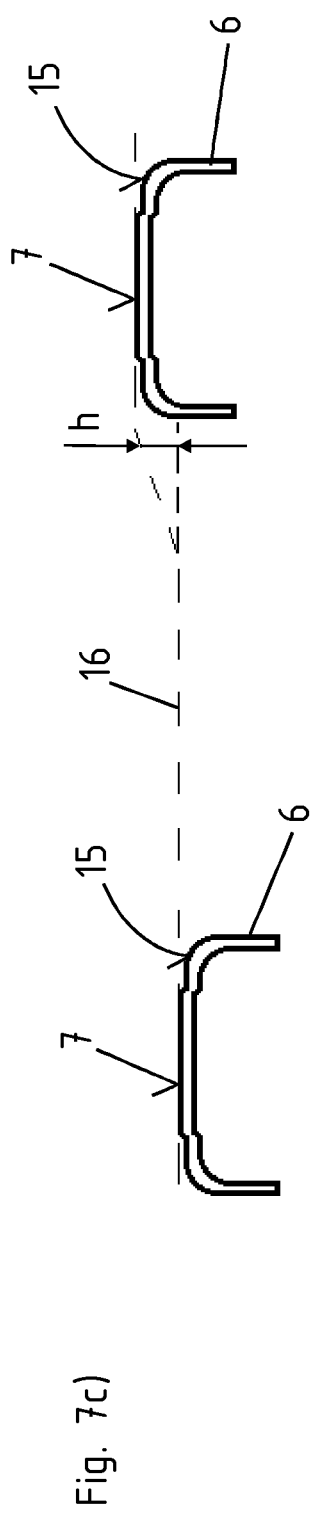

Further advantages, features, properties and embodiments of the present invention form the subject-matter of the following description. Preferred variants are shown in the schematic drawings. These drawings serve for clear understanding of the invention, in which:

FIG. 1 shows an instrument panel support produced according to the invention in a perspective view, FIG. 2 shows the instrument panel support during production with the die inserted and the stamp die pushed in, FIG. 3 shows a detailed view of FIG. 2, FIG. 4 shows the partial view of FIG. 3 in a cross-sectional view, FIG. 5 shows the receiving surface to be produced in an arm in plan view, FIGS. 6a and b show a perspective view of an arm with two receiving surfaces produced before and after the stamping operation and FIG. 7a to c show three different variants of arrangements of receiving surfaces of two arms to one another.

In the figures, the same reference numerals are used for the same or similar components, even when a repeated description is dispensed with for reasons of simplicity.

FIG. 1 shows the instrument panel support 1 according to the invention in a perspective view. The instrument panel support 1 in this case has a tube 2 extending transversely, wherein at the ends 3 of the tube 2 fastening points 4 are arranged in each case for coupling to a motor vehicle body, not shown in more detail, in particular in the region of the A-pillar. Moreover, various protruding functional arms 5 are arranged in order to receive electronic components, airbag modules, glove compartments, longitudinal pillars or similar components, not shown in more detail. To this end, the functional arms 5 are welded, in particular, to the tube 2. The tube 2 itself may be produced as a profile, as a shaped component or even as a welded component. Moreover, two arms 6 are arranged on the tube 2, wherein receiving surfaces 7 for receiving a head-up display, not shown in more detail, are configured on the arms 6.

FIG. 2 shows in this case the production process relating to the calibration of the receiving surfaces 7 in a perspective view. To this end, the component is inserted in a calibration tool 8, partially shown, wherein the instrument panel support 1 is produced as a welded component with the arms 6 and inserted in a calibration tool 8, partially shown. In the calibration tool 8 the position of the fastening points 4 is established and then the relative position of the arms 6 to the fastening point 4 is established, wherein by a die 9 being moved toward the arms 6 and scanning the arms 6 by a sensor 18, said die being configured here in two parts. Then, from the side opposing the die 9, stamp dies 10 are moved toward the arms 6. In this case, the arms 6 have the geometric shape of a hat-shaped profile in cross section, wherein in the hat-shaped profile and clearly visible in FIG. 5 one respective receiving surface 7 is cut out of its outer peripheral edge 11. The receiving surface 7 is then connected to the remainder of the arm 6 via four webs 12, wherein openings 13 and/or already previously inserted threaded supports 17 are provided in the receiving surface 7 for coupling to a head-up display, not shown in more detail.

So that the receiving surface 7 remains flat per se, a spring material 14, for example in the form of a polymer body and/or a spring assembly, is arranged in the die 9. This is clearly shown in FIGS. 3 and 4. If the calibration tool 8 consisting of the die 9 and stamp die 10 is moved toward the arm 6, by pushing in the stamp die 10 further relative to the rigidly arranged die 9, the receiving surface 7 is deformed and/or stamped in the direction of the die, wherein in this case the spring assembly is also forced into the die 9 counter to the spring force. This is shown very clearly in FIG. 4. The stamp die 10 in this case is pushed sufficiently far into the die 9 that the deformed receiving surface 7 has the required accuracy. In particular, the receiving surface 7 is deformed with an oversized portion so that when the stamp die 10 is retracted the shaped receiving surface 7 springs back to a desired dimension of the receiving surface 7 in relation to the fastening point 4 shown in FIG. 2.

Figure 6B:
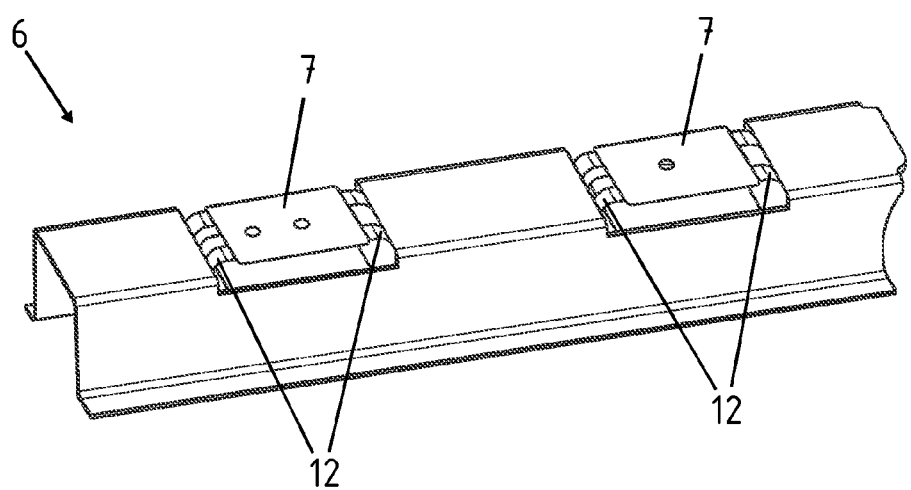

FIGS. 6a and b show such an arm 6 before and after the calibration operation in a perspective view without said arm being coupled to the instrument panel support 1. The arm 6 itself has two receiving surfaces 7 which, according to FIG. 6b, are shaped using shaping techniques, relative to a web of the arm 6 which is configured as a hat-shaped profile, in particular in the motor vehicle Z-direction.

FIG. 7 shows the two arms 6 visible in FIG. 1 adjacent to one another by the spacing a, in a schematic cross-sectional view. In this case, the arms are configured as U-shaped profiled bodies. It may be seen that in each case relative to a web 15 of the arm 6, the receiving surface 7 is configured to protrude so that the receiving surfaces 7 of both arms 6 of FIG. 7a are at the same height.

According to FIG. 7b, the left-hand and right-hand receiving surfaces 7 relative to the drawing plane are configured to protrude relative to the web 15 of the respective arm 6, and the left-hand receiving surface 7 relative to the drawing plane is inclined by the angle α to a connecting line of both receiving surfaces 7 relative to one another.

A further variant is shown in FIG. 7c, wherein both receiving surfaces 7 are positioned relative to one another by a height offset h to the connecting line 16. The respective relative position of each receiving surface 7 to a fastening point, not shown in more detail in FIG. 7, and the receiving surfaces 7 to one another is in this case produced with high geometric precision having, in particular, a tolerance of less than or equal to +/−0.25 mm.

LIST OF REFERENCE NUMERALS

1—Instrument panel support
2—Tube
3—End of 2
4—Fastening point
5—Functional arm
6—Arm
7—Receiving surface
8—Calibration tool
9—Die
10—Stamp die
11—Edge of 7

12—Web of 7
13—Opening
14—Spring material
15—Web of 6
16—Connecting line
17—Threaded support
18—Sensor
a—Spacing
h—Height offset
α—Angle

The invention claimed is:

1. An instrument panel support for receiving a head-up display, comprising:
    an elongated main body extending in the transverse direction of a motor vehicle,
    said elongated main body having a two opposing end fastening points for coupling to said motor vehicle body,
    at least two arms each having an upper surface and attached to said main elongated body,
    wherein each of said at least two arms includes at least one stamped receiving surface surrounded by said upper surface made as one-piece and same material as said at least two arms,
    wherein each of said at least one receiving surface is configured to be offset parallel or at an angle relative to said surrounded upper surface of the arm and held in place with a plurality of webs,
    wherein the at least one stamped receiving surface has a tolerance of less than or equal to plus/minus 0.25 mm relative to the fastening point in the motor vehicle vertical direction.

2. The instrument panel support as claimed in claim 1, characterized in that one arm has two receiving surfaces.

3. The instrument panel support as claimed in claim 1, characterized in that the receiving surfaces of both arms are arranged in one plane or in that the receiving surfaces of both arms are arranged in parallel and offset to one another.

4. The instrument panel support as claimed in claim 1, characterized in that the receiving surfaces of both arms are arranged at an angle to one another.

* * * * *